(12) United States Patent
Nakao

(10) Patent No.: US 10,982,630 B2
(45) Date of Patent: Apr. 20, 2021

(54) AIR CLEANER OF INTERNAL COMBUSTION ENGINE

(71) Applicant: TOYOTA BOSHOKU KABUSHIKI KAISHA, Aichi-ken (JP)

(72) Inventor: Shinya Nakao, Kariya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 453 days.

(21) Appl. No.: 15/960,043

(22) Filed: Apr. 23, 2018

(65) Prior Publication Data

US 2018/0340498 A1 Nov. 29, 2018

(30) Foreign Application Priority Data

May 23, 2017 (JP) .............................. JP2017-101736

(51) Int. Cl.
*F02M 35/12* (2006.01)
*F02M 35/024* (2006.01)
(Continued)

(52) U.S. Cl.
CPC ..... *F02M 35/1288* (2013.01); *B01D 46/0005* (2013.01); *B01D 46/10* (2013.01);
(Continued)

(58) Field of Classification Search
CPC ........... F02M 35/1288; F02M 35/1205; F02M 35/1261; F02M 35/1272; F02M 35/02416;
(Continued)

(56) References Cited

U.S. PATENT DOCUMENTS 10,500,532 B2 * 12/2019 Inuzuka .................. B01D 46/10
10,539,066 B1 * 1/2020 Owen .................. F02B 29/0475
(Continued)

FOREIGN PATENT DOCUMENTS

DE      3429633 A1 *  2/1986  ........... B01D 46/521
EP      0896148 A2 *  2/1999  ......... F02M 35/0203
(Continued)

OTHER PUBLICATIONS

Chinese Office Action for CN201810450147.9 dated Mar. 20, 2020, along with English language translation thereof.
(Continued)

*Primary Examiner* — Forrest M Phillips
(74) *Attorney, Agent, or Firm* — Greenblum & Bernstein, P.L.C.

(57) ABSTRACT

An air cleaner of an internal combustion engine is provided with a first housing including an inlet, a second housing including an outlet, and a filter element located between the first housing and the second housing. A Helmholtz resonator is arranged inside the first housing. An upright wall projects from a bottom wall of the first housing toward the filter element and extends in an axial direction of the inlet. The upright wall forms a chamber of the Helmholtz resonator. A noise-absorption region is defined by the upright wall, a side wall of the first housing, the bottom wall, and the filter element. The noise-absorption region leads to the inlet and extends in the axial direction.

5 Claims, 6 Drawing Sheets

(51) Int. Cl.
  *B01D 46/52* (2006.01)
  *B01D 46/10* (2006.01)
  *B01D 46/00* (2006.01)
  *B01D 46/42* (2006.01)
  *G10K 11/172* (2006.01)
  *G10K 11/16* (2006.01)

(52) U.S. Cl.
  CPC ....... *B01D 46/4236* (2013.01); *B01D 46/521* (2013.01); *F02M 35/02416* (2013.01); *F02M 35/1205* (2013.01); *F02M 35/1261* (2013.01); *F02M 35/1272* (2013.01); *G10K 11/161* (2013.01); *G10K 11/172* (2013.01); *B01D 2279/60* (2013.01)

(58) Field of Classification Search
  CPC .... G10K 11/172; G10K 11/161; B01D 46/10; B01D 46/4236; B01D 46/521; B01D 2279/60
  USPC .......................................................... 181/224
  See application file for complete search history.

(56) References Cited

U.S. PATENT DOCUMENTS

| | | | | |
|---|---|---|---|---|
| 2009/0178879 | A1* | 7/2009 | Park | F02M 35/1272 |
| | | | | 181/224 |
| 2017/0045021 | A1* | 2/2017 | Foreman | F02M 35/1283 |
| 2017/0321640 | A1* | 11/2017 | Kimura | F02M 35/02491 |
| 2018/0056222 | A1* | 3/2018 | Inuzuka | F02M 35/0201 |

FOREIGN PATENT DOCUMENTS

| | | | |
|---|---|---|---|
| JP | 2003-227427 | | 8/2003 |
| JP | 2007077963 | | 3/2007 |
| JP | 2014-227874 | | 12/2014 |
| KR | 20-0472761 | | 6/2014 |
| WO | WO-2016120536 A1 * | 8/2016 | ............. F02M 35/14 |

OTHER PUBLICATIONS

Japanese Office Action in counterpart application No. 2017-101736, dated Dec. 1, 2020 (and machine translation thereof).

\* cited by examiner

AIR CLEANER OF INTERNAL COMBUSTION ENGINE

BACKGROUND

The present invention relates to an air cleaner of an internal combustion engine.

An air cleaner of an internal combustion engine is arranged in an intake passage to filter intake air. The air cleaner is provided with a first housing including an inlet, a second housing including an outlet, and a filter element located between the first housing and the second housing. An inlet duct is connected to the inlet of the first housing.

One problem of an internal combustion engine is intake noise. Japanese Laid-Open Patent Publication No. 2014-227874 describes an example of an air cleaner including a Helmholtz resonator located inside the first housing to reduce intake noise of a certain frequency band.

SUMMARY

It is known that intake noise of a further lower frequency band, which is disturbing, can be reduced by increasing the piping length of the inlet duct or decreasing the inner diameter of the inlet duct. However, when the internal combustion engine is installed in, for example, a vehicle, it may be difficult for the inlet duct to have a sufficient length because of the available space. Further, a decrease in the inner diameter of the inlet duct will decrease the cross-sectional area of the flow path for intake air and thus increase pressure loss.

It is an object of the present invention to provide an air cleaner of an internal combustion engine that allows intake noise of a further lower frequency band to be reduced.

In one aspect of the present invention, an air cleaner of an internal combustion engine is provided with a first housing including an inlet, a second housing including an outlet, and a filter element located between the first housing and the second housing. The air cleaner includes a Helmholtz resonator arranged inside the first housing. An upright wall projects from a bottom wall of the first housing toward the filter element and extends in an axial direction of the inlet. The upright wall forms a chamber of the Helmholtz resonator. A noise-absorption region is defined by the upright wall, a side wall of the first housing, the bottom wall, and the filter element. The noise-absorption region leads to the inlet and extends in the axial direction.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment will now be described with reference to FIGS. 1 to 9.

Figure 1:
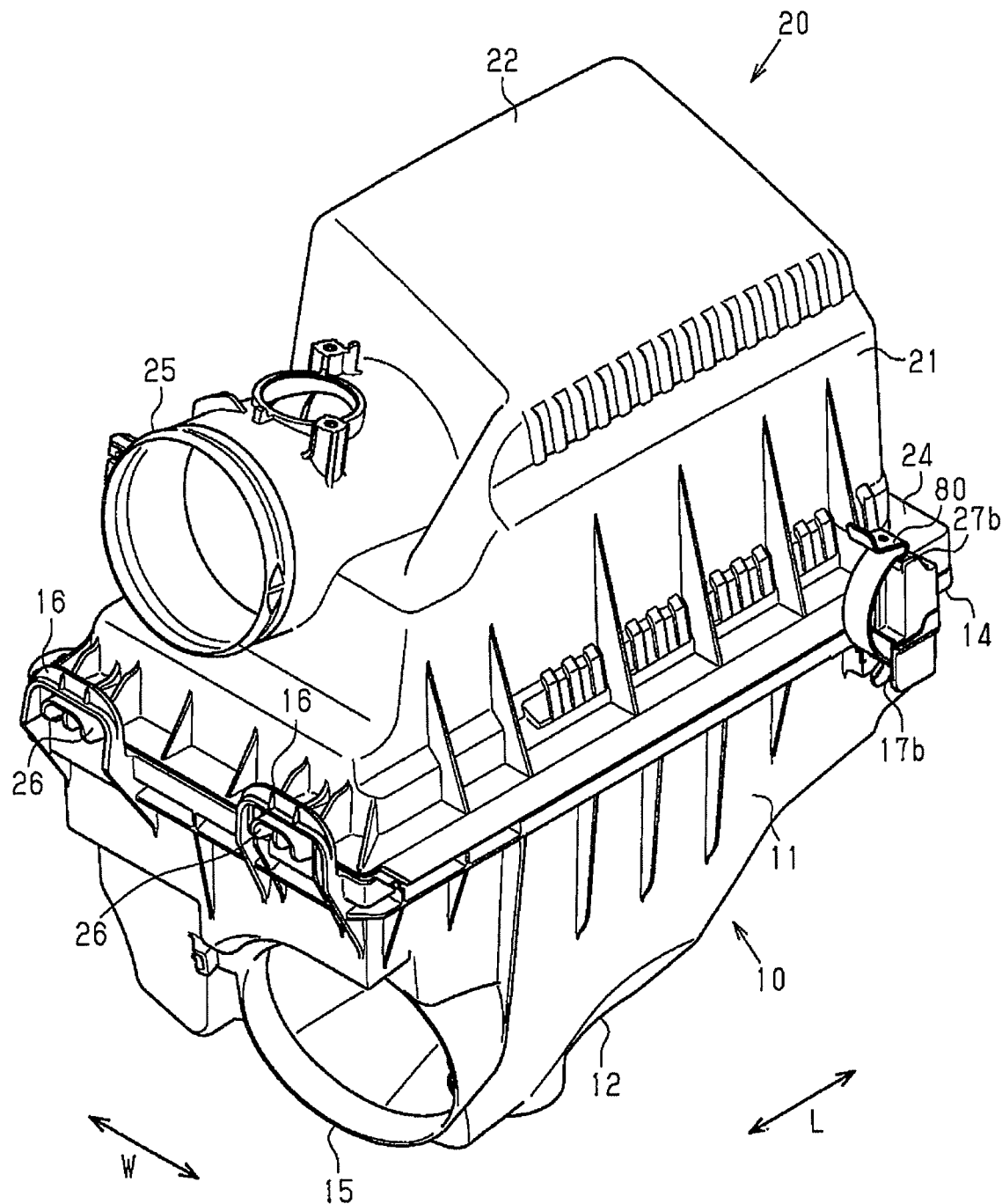
FIG. 1 is a perspective view entirely showing an air cleaner of an internal combustion engine in accordance with one embodiment.
Figure 4:
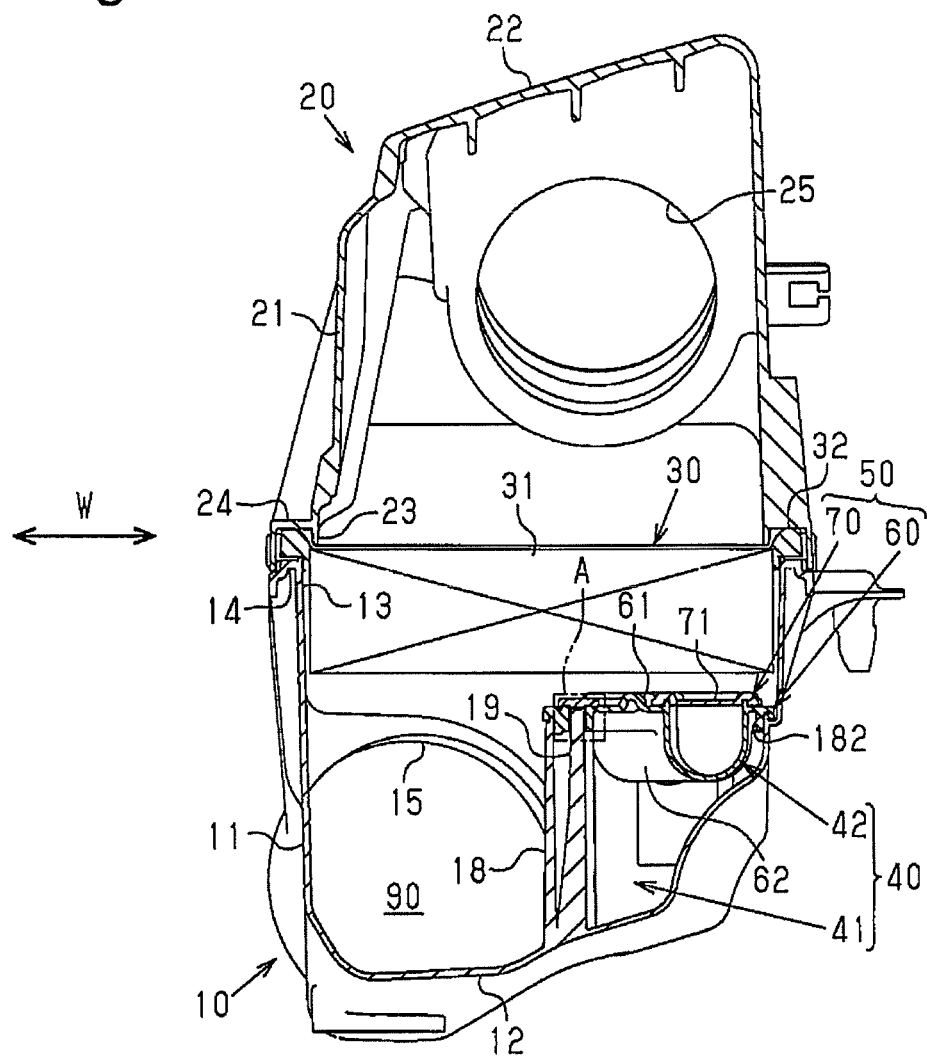
FIG. 4 is a cross-sectional view of the air cleaner taken along line 4-4 in FIG. 7.
Figure 6:
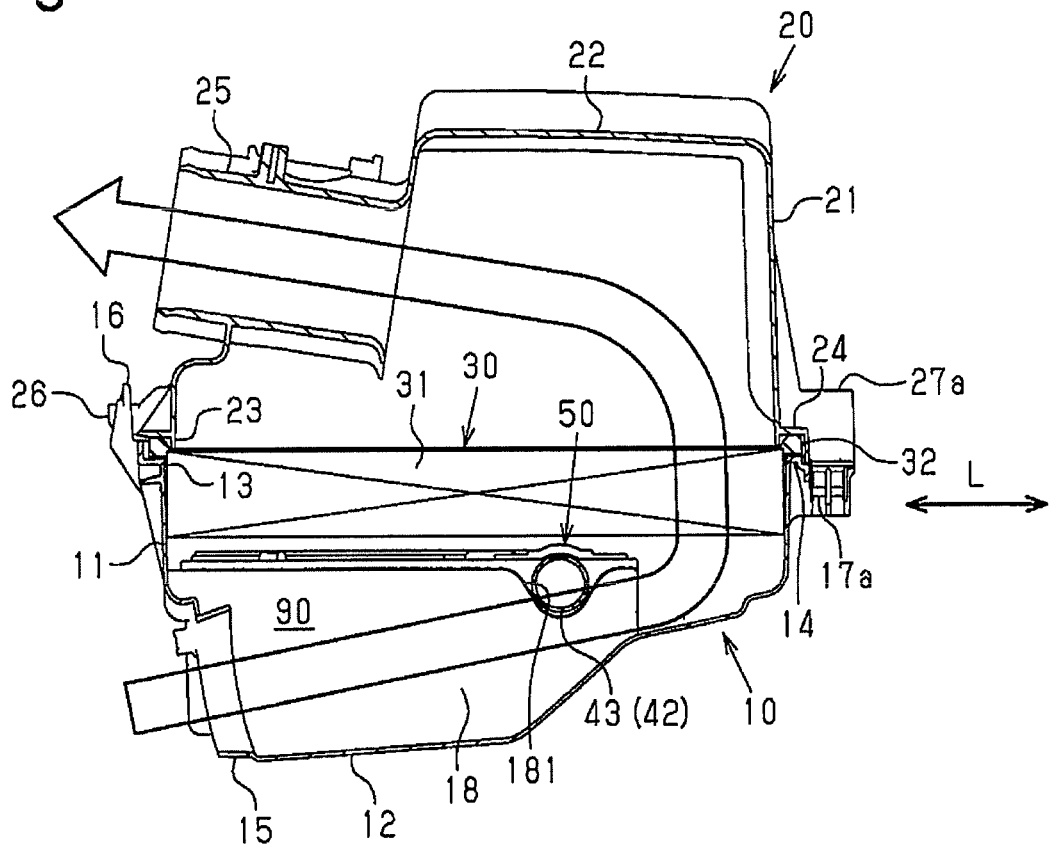
FIG. 6 is a cross-sectional view of the air cleaner taken along line 6-6 in FIG. 7.

An air cleaner is arranged in an intake passage of an internal combustion engine and filters intake air. As shown in FIGS. 1, 4, and 6, the air cleaner is provided with a first housing 10 that includes an inlet 15 and a second housing 20 that includes an outlet 25.

Figure 2:
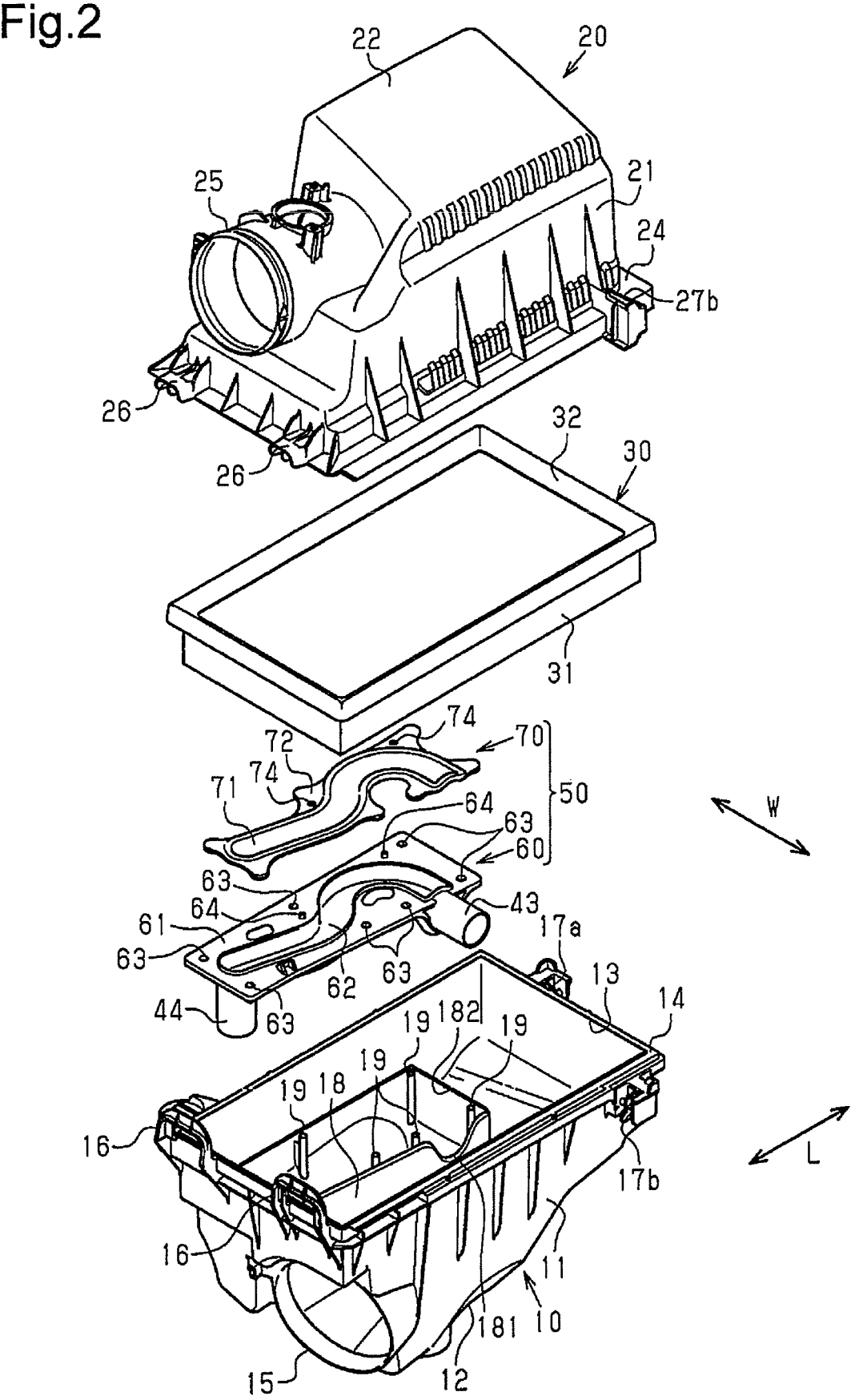
FIG. 2 is an exploded perspective view of the air cleaner shown in FIG. 1 illustrating a first housing, a first plate, a second plate, a filter element, and a second housing that are separated from one another.

As shown in FIGS. 2, 4, and 6, a filter element 30 is arranged between the first housing 10 and the second housing 20.

The basic structure of the filter element 30, the first housing 10, and the second housing 20 will now be described.

Filter Element 30

As shown in FIGS. 2, 4, and 6, the filter element 30 includes a filter 31 and a seal 32 arranged on the periphery of the filter 31. The filter 31 includes a filter sheet such as a pleated non-woven fabric or filter paper. The filter 31 of the present embodiment is box-shaped and has a low profile. The seal 32 is formed of a foam material such as, for example, closed-cell polyurethane foam.

First Housing 10

As shown in FIGS. 2 to 4, 6, and 7, the first housing 10 includes a first opening 13 that accommodates the filter 31 of the filter element 30. The first opening 13 is rectangular in a plan view.

The first housing 10 includes side walls 11 that define the first opening 13 and a bottom wall 12 opposing the first opening 13. A flange 14 extends along the entire periphery of the first opening 13.

The cylindrical inlet 15 is located in the side wall 11 corresponding to one short side of the rectangular first opening 13.

In the description hereafter, with regard to the four sides of the first opening 13 in the first housing 10, the direction in which the long sides extend will be referred to as "the length direction L" and the direction in which the short sides extend will be referred to ask "the width direction W." In the length direction L, the side closer to the inlet 15 may be referred to as "the closer side" and the side farther from the inlet 15 may be referred to as "the farther side." The circumferential direction of the first opening 13 will simply be referred to as "the circumferential direction."

As shown in FIGS. 1 to 4, the inlet 15 arranged in the side wall 11 is located toward one side in the width direction W.

As shown in FIGS. 1 to 3, 6, and 7, two arch members 16 project from the outer surface of the side wall 11 including the inlet 15 beyond the flange 14 and toward the second housing 20. The arch members 16 are spaced apart from each other in the circumferential direction.

A support 17a projects from the outer surface of the side wall 11 that opposes the side wall 11 including the inlet 15. A support 17b projects from the outer surface of one of the side walls 11 that extend in the length direction L.

As shown in FIG. 1, the supports 17a and 17b each support a clamp 80 in an inclinable manner.

Second Housing 20

As shown in FIGS. 4 and 6, the second housing 20 includes a second opening 23 that is rectangular in a plan view and opposes the first opening 13 of the first housing 10.

The second housing 20 includes side walls 21 that surround the second opening 23 and a top wall 22 that opposes the second opening 23. A flange 24 extends over the entire periphery of the second opening 23.

As shown in FIGS. 1, 2, 4, and 6, the cylindrical outlet 25 is located in the side wall 21 that corresponds to one short side of the second opening 23. The outlet 25 of the present embodiment is located at the same side as the inlet 15 in the length direction L.

As shown in FIGS. 1, 2, and 6, two projections 26 project toward the outer side from the outer surface of the flange 24 at portions corresponding to the two arch members 16 of the first housing 10.

Portions of the flange 24 corresponding to the supports 17a and 17b of the first housing 10 respectively define engagement portions 27a and 27b that are engaged with the clamps 80.

In a state in which the filter 31 of the filter element 30 is accommodated in the first opening 13 of the first housing 10, as shown in FIG. 1, the two projections 26 are respectively inserted through the two arch members 16, and the clamps 80 are respectively engaged with the engagement portions 27a and 27b to couple the first housing 10 and the second housing 20.

Consequently, as shown in FIGS. 4 and 6, the seal 32 of the filter element 30 is held between the flange 14 of the first housing 10 and the flange 24 of the second housing 20. This seals gaps between the first housing 10 and the seal 32 and between the second housing 20 and the seal 32.

The two arch members 16 and the two projections 26 also function as hinges supporting the second housing 20 in a manner inclinable relative to the first housing 10.

The features of the air cleaner in accordance with the present embodiment will now be described.

As shown in FIG. 4, a Helmholtz resonator (hereinafter simply referred to as "the resonator 40") and a noise-absorption region 90, which leads to the inlet 15, are provided inside the first housing 10 next to each other in the width direction W.

Resonator 40

Figure 3:
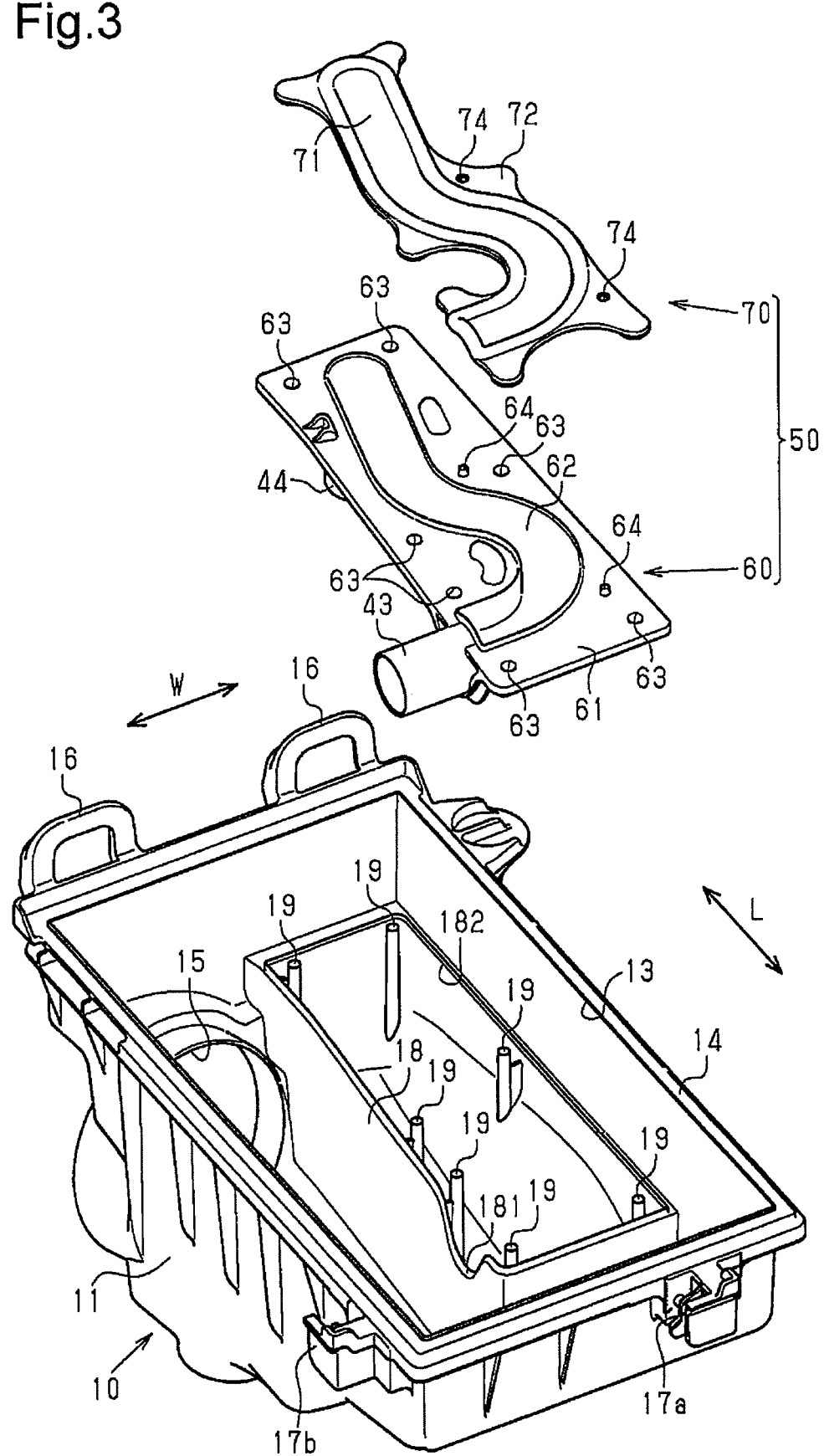
FIG. 3 is a perspective view of the first housing, the first plate, and the second plate shown in FIG. 2 that are separated from one another.

As shown in FIGS. 2 to 4, an upright wall 18 integrated with the bottom wall 12 is provided in the first housing 10. The upright wall 18, together with the side wall 11, surrounds a third opening 182 that is substantially rectangular in a plan view. The upright wall 18 projects from the bottom wall 12 toward the filter element 30.

Figure 7:
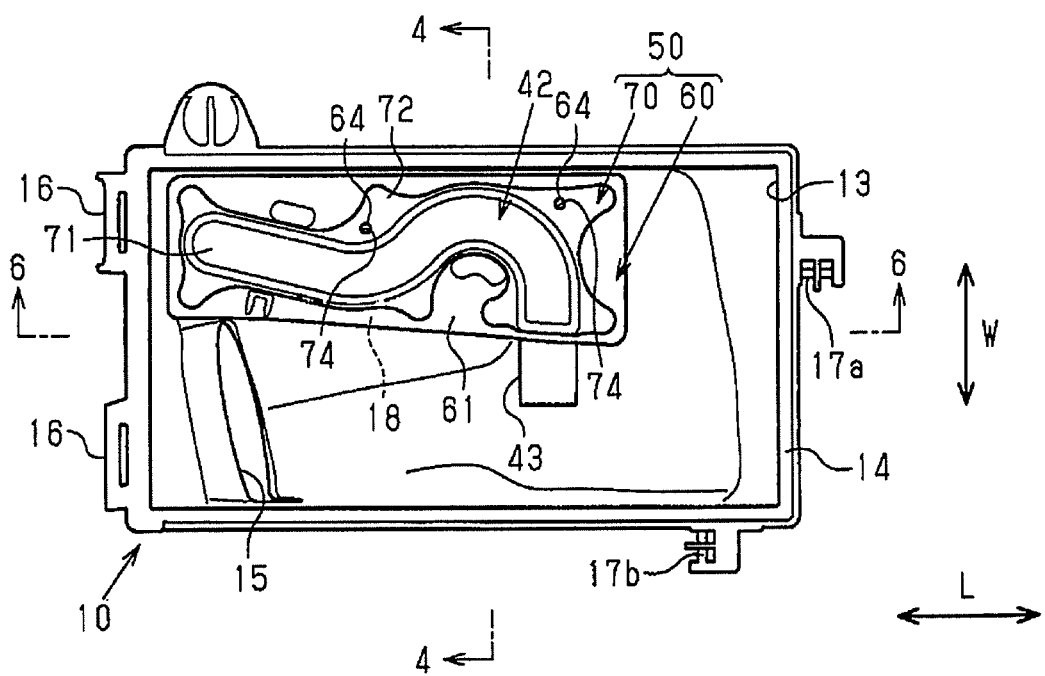
FIG. 7 is a plan view of the first housing shown in FIG. 3 with a lid attached to the first housing.

As shown in FIGS. 6 and 7, part of the upright wall 18 is located at substantially the middle of the first housing 10 in the width direction W and extends in the axial direction of the inlet 15. In the present embodiment, this part of the upright wall 18 extends toward the farther side from the middle position of the first housing 10 in the axial direction (length direction L), that is, extends beyond one half of the length of the first housing 10 in the axial direction.

Further, as shown in FIGS. 2 to 4, the aforementioned part of the upright wall 18 includes an arcuate recess 181.

Pins 19 are integrated with the bottom wall 12, the upright wall 18, or the side wall 11. The pins 19 extend inside the third opening 182 and toward the first opening 13.

As shown in FIGS. 4, 6, and 7, a lid 50 is arranged inside the first housing 10 to close the third opening 182. The side wall 11, the bottom wall 12, the upright wall 18, and the lid 50 form a chamber 41 of the resonator 40.

Lid 50

As shown in FIGS. 2 to 4, the lid 50 includes a first plate 60 and a second plate 70.

First Plate 60

Figure 8:
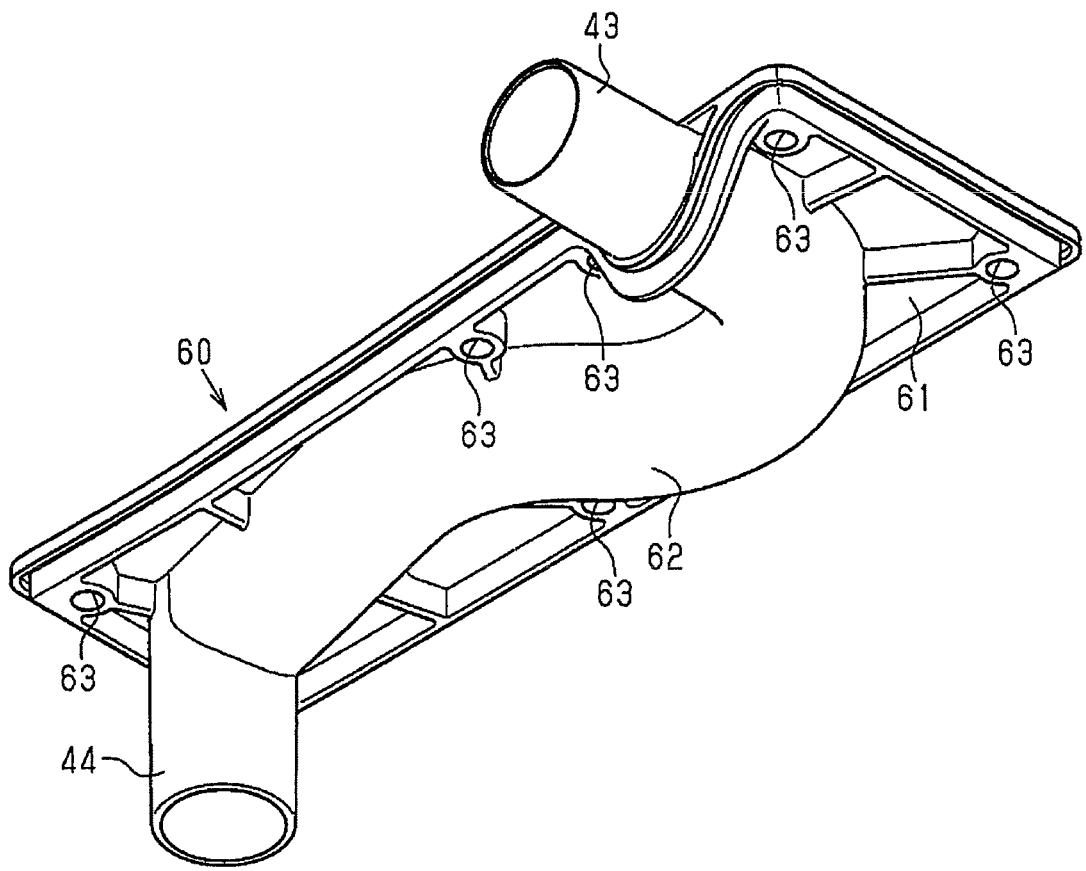
FIG. 8 is a perspective view showing the first plate of FIG. 3 from a bottom side.
Figure 9:
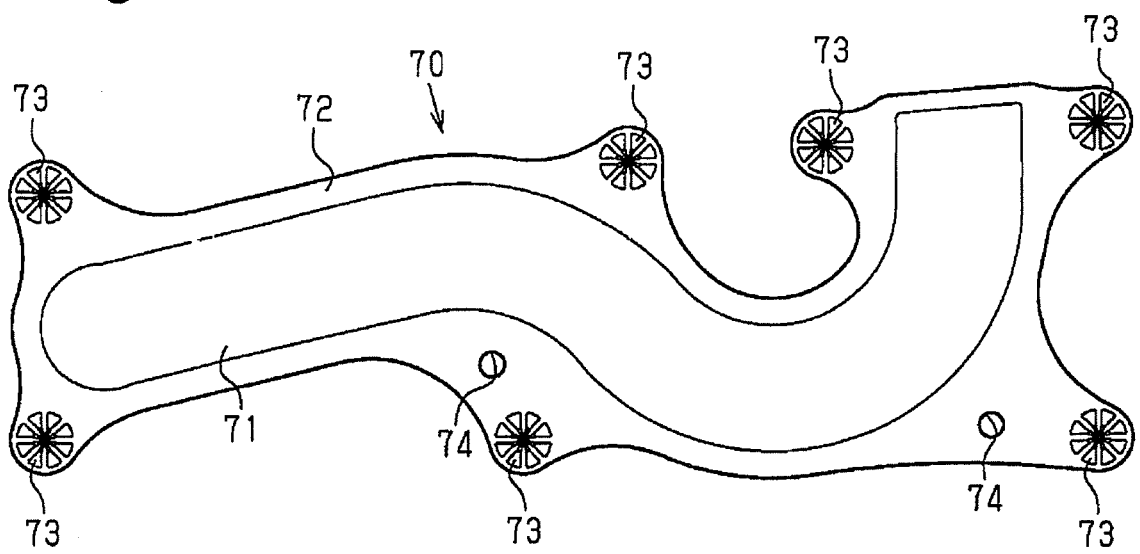
FIG. 9 is a plan view showing a bottom surface of the second plate of FIG. 3.

As shown in FIGS. 2, 3, and 8, the first plate 60 includes a plate portion 61, a semi-cylindrical bulged portion 62 bulged toward the inner side of the chamber 41 from the plate portion 61, a cylindrical entrance 43 connected to one end of the bulged portion 62, and an exit 44 connected to the other end of the bulged portion 62.

The peripheral part of the plate portion 61 includes insertion holes 63 that are spaced apart from one another. The surface of the plate portion 61 opposing the second plate 70 includes two positioning projections 64.

The bulged portion 62 meanders along the surface of the plate portion 61.

The entrance 43, which projects outward from the edge of the plate portion 61, is received in the recess 181 of the upright wall 18 (refer to FIG. 6). Thus, as shown in FIG. 7, the entrance 43 extends through the upright wall 18 and projects into the noise-absorption region 90.

As shown in FIGS. 2 and 8, the exit 44 projects from the other end of the bulged portion 62 toward the bottom wall 12.

Second Plate 70

As shown in FIGS. 2, 3, 7, and 9, the second plate 70 includes a flat pipe formation portion 71, a peripheral portion 72, and joining portions 73. The pipe formation portion 71, together with the bulged portion 62, forms a communication pipe 42 of the resonator 40. The peripheral portion 72 surrounds the pipe formation portion 71. The joining portions 73 are located on the bottom side of the peripheral portion 72. Two positioning holes 74 extend through the peripheral portion 72.

The bulged portion 62 of the first plate 60, the pipe formation portion 71 of the second plate 70, the entrance 43, and the exit 44 form the communication pipe 42.

The pins 19 of the first housing 10 are inserted through the insertion holes 63 of the first plate 60. The edges of the first plate 60 are supported by the edges of the third opening 182 to close the third opening 182 with the plate portion 61 (refer to FIG. 4).

As shown in FIG. 7, the two projections 64 of the first plate 60 are inserted into the two holes 74 of the second plate 70. This positions the second plate 70 relative to the first plate 60.

Figure 5:
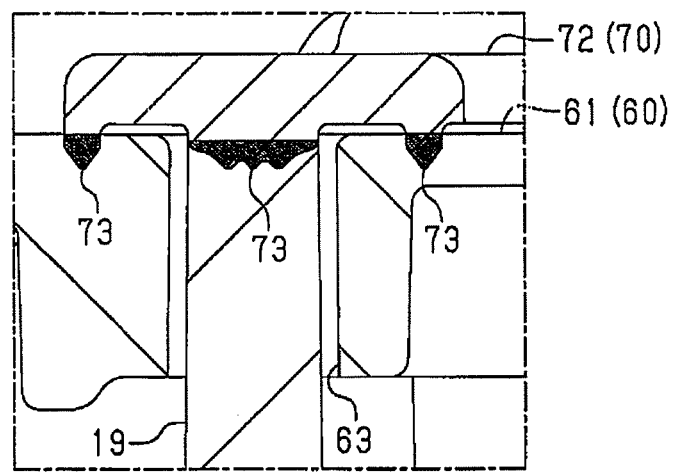
FIG. 5 is an enlarged view of portion A shown in FIG. 4.

In this state, as shown in FIG. 5, the distal ends of the pins 19 on the first housing 10 and the circumferential portions of the insertion holes 63 in the first plate 60 are joined with the joining portions 73 of the second plate 70 through ultrasonic welding. This fixes the first plate 60 and the second plate 70, namely, the lid 50, to the first housing 10.

As shown in FIGS. 4 and 6, the noise-absorption region 90 is defined by the upright wall 18 that extends in the axial direction of the inlet 15, the side wall 11 of the first housing 10 opposing the upright wall 18, the bottom wall 12, and the filter 31 of the filter element 30. Further, the noise-absorption region 90 leads to the inlet 15 and extends in the axial direction.

In the present embodiment, the cross-sectional area of the flow path in the noise-absorption region 90 is set to be equivalent to that of the inlet 15.

The operation of the present embodiment will now be described.

The air cleaner of the present embodiment reduces intake noise of a certain frequency band with the resonator 40 located inside the first housing 10.

The upright wall 18 forming the chamber 41 of the resonator 40, the side wall 11 of the first housing 10, the bottom wall 12, and the filter 31 of the filter element 30 define the noise-absorption region 90 that leads to the inlet 15. Further, the flow path cross-sectional area of the inlet 15 is set to be equivalent to the flow path cross-sectional area of the noise-absorption region 90. Thus, the noise-absorption region 90 substantially extends the inlet 15. This reduces intake noise of a further lower frequency band.

The present embodiment has the advantages described below.

(1) The Helmholtz resonator (resonator 40) is arranged inside the first housing 10. The upright wall 18 forming the chamber 41 of the resonator 40 projects from the bottom wall 12 of the first housing 10 toward the filter element 30 and extends in the axial direction of the inlet 15. The upright wall 18, the side wall 11 of the first housing 10, the bottom wall 12, and the filter element 30 define the noise-absorption region 90 that leads to the inlet 15 and extends in the axial direction.

This structure allows intake noise of a further lower frequency band to be reduced.

The structure described above substantially extends the inlet 15 with the noise-absorption region 90 formed inside the first housing 10. Thus, the piping length of the inlet duct connected to the inlet 15 can be shortened and the air cleaner can be installed more easily. Further, intake noise can be reduced without decreasing the diameter of the inlet 15 and the inlet duct. This limits pressure loss.

(2) The upright wall 18 extends beyond one half of the length of the first housing 10 in the axial direction.

Such a structure obtains the length of the noise-absorption region 90 in the axial direction of the inlet 15. Thus, the noise-absorption region 90 substantially extends the inlet 15 and reduces intake noise of a further lower frequency band.

As shown by the arrow in FIG. 6, dust suspended in the air entering the first housing 10 through the inlet 15 acts to continuously move straight forward because of inertial force. Thus, the dust reaches the farther side of the first housing 10 and collects on the filter 31 of the filter element 30 from the farther side. Accordingly, in contrast to when the dust collects on the entire filter 31, an increase in pressure loss of the filter element 30 can be delayed and the life of the filter element 30 can be extended.

(3) The lid 50, which defines part of the chamber 41 and closes the opening defined by the upright wall 18, is arranged inside of the first housing 10. The communication pipe 42, which connects the inner side and outer side of the chamber 41 and forms the resonator 40 with the chamber 41, is integrated with the lid 50 along the surface of the lid 50.

With this structure, the communication pipe 42 obtains a certain amount of length. Thus, the resonator 40 can reduce intake noise of a further lower frequency band.

(4) The lid 50 is provided with the first plate 60, which includes the plate portion 61 and the semi-cylindrical bulged portion 62 bulged from the plate portion 61 toward the inner side of the chamber 41, and the second plate 70, which is coupled to the plate portion 61 to form the communication pipe 42 with the bulged portion 62.

This structure limits bulging of the lid 50 toward the filter element 30 that would occur when the communication pipe 42 is arranged on the lid 50. Thus, the upright wall 18 can be located proximate to the filter element 30, and the volume of the chamber 41 in the resonator 40 can be increased without increasing the volume of the first housing 10. Accordingly, the resonator 40 can reduce intake noise of a further lower frequency band.

(5) The exit 44 of the communication pipe 42 is cylindrical and projects from the bulged portion 62 into the chamber 41. This allows the piping length of the communication pipe 42 to be further increased so that the resonator 40 reduces intake noise of a further lower frequency band.

(6) The entrance 43 of the communication pipe 42 projects into the noise-absorption region 90. This allows the piping length of the communication pipe 42 to be further increased so that the resonator 40 reduces intake noise of a further lower frequency band.

(7) The upright wall 18 includes the recess 181 that receives the entrance 43. Thus, the entrance 43 of the communication pipe 42 can be projected into the noise-absorption region 90 along the surface of the lid 50.

(8) The bulged portion 62 meanders along the surface of the plate portion 61. This further increases the piping length of the communication pipe 42 so that the resonator 40 reduces intake noise of a further lower frequency band.

(9) The distal ends of the pins 19 on the first housing 10 and the circumferential portions of the insertion holes 63 in the first plate 60 are joined with the joining portions 73 of the second plate 70 through ultrasonic welding.

With this structure, the first housing 10, the first plate 60, and the second plate 70 are joined and fixed with one another at the same time. This simplifies the process for coupling the three components forming the chamber 41 of the resonator 40.

MODIFIED EXAMPLES

It should be apparent to those skilled in the art that the present invention may be embodied in many other specific forms without departing from the spirit or scope of the invention. Particularly, it should be understood that the present invention may be embodied in the following forms.

The entrance 43 of the communication pipe 42 may be formed so as not to project into the noise-absorption region 90.

The pipe formation portion 71 of the second plate 70 may be semi-cylindrical and bulged from the peripheral portion 72 toward the filter element 30.

The bottom of the bulged portion 62 may include a through hole that functions as the exit of the communication pipe 42.

The dimensions of the upright wall 18 in the length direction L may be changed as required.

The present examples and embodiments are to be considered as illustrative and not restrictive, and the invention is not to be limited to the details given herein, but may be modified within the scope and equivalence of the appended claims.

The invention claimed is:

1. An air cleaner of an internal combustion engine, wherein the air cleaner is provided with a first housing including an inlet, a second housing including an outlet, and a filter element located between the first housing and the second housing, the air cleaner comprising:
   a Helmholtz resonator arranged inside the first housing;
   an upright wall that projects from a bottom wall of the first housing toward the filter element and extends in an axial direction of the inlet, wherein the upright wall forms a chamber of the Helmholtz resonator;
   a noise-absorption region defined by the upright wall, a side wall of the first housing, the bottom wall, and the filter element, wherein the noise-absorption region leads to the inlet and extends in the axial direction;

a lid that closes an opening defined by the upright wall and defines part of the chamber; and a communication pipe that connects an inner side and an outer side of the chamber and forms the Helmholtz resonator with the chamber, wherein the communication pipe is integrated with the lid along a surface of the lid and includes an exit projecting into the chamber toward the bottom wall of the first housing.

2. The air cleaner according to claim 1, wherein the upright wall extends beyond one half of a length of the first housing in the axial direction.

3. The air cleaner according to claim 1, wherein
the lid includes a first plate and a second plate,
the first plate includes a plate portion and a semi-cylindrical bulged portion bulged from the plate portion toward the inner side of the chamber, and
the second plate is coupled to the plate portion and forms the communication pipe with the bulged portion.

4. The air cleaner according to claim 3, wherein the exit is a cylindrical exit projecting into the chamber from the bulged portion.

5. The air cleaner according to claim 1, wherein the communication pipe includes an entrance that projects into the noise-absorption region.

* * * * *